United States Patent Office

3,471,615
Patented Oct. 7, 1969

3,471,615
GRISEOFULVIN-PEREZONE COMPOSITION
Arthur D. Chandler, Jr., and Herbert J. Florestano, Indianapolis, Ind., assignors to The Dow Chemical Company, Midland, Mich., a corporation of Delaware
No Drawing. Filed Dec. 27, 1966, Ser. No. 604,590
Int. Cl. A61k 21/00; C07g 11/00
U.S. Cl. 424—195       5 Claims

ABSTRACT OF THE DISCLOSURE

Antimicrobial compositions containing synergistic mixtures of griseofulvin and perezone as the active ingredient, and compositions for oral and for topical administration comprising griseofulvin, perezone and a pharmaceutical carrier.

---

This invention relates to antimicrobial compositions including a mixture of griseofulvin and perezone. More particularly, this invention is concerned with pharmaceutical preparations comprising griseofulvin and perezone wherein the preparations possess significant antimicrobial activity.

Griseofulvin is an antibiotic isolated from *Penicillium griseofulvum* or from *Penicillium janczewskii*. Griseofulvin has been shown to be effective against recognized species of dermatophytes such as *Microsporum canis, M. gypseum, M. audouini, Epidermophyton floccosum, Trichophyton mentagrophytes, T. rubrum, T. tonsurans, T. megnini, T. gallinae, T. schoenleini* and other Trichophyton species. Griseofulvin has failed to demonstrate significant in vitro activity against *Candida albicans* and has been found to be ineffective in high concentrations against bacteria commonly encountered in infectious diseases. In the treatment of certain superficial dermatophytoses of both man and lower animals, griseofulvin has been administered almost exclusively by the oral route. Attempts to treat fungus infections of the skin with topical preparations of the antibiotic have not been particularly successful.

Perezone (pipitzahoic acid) is an orange crystalline substance which is isolated from plants of the Perezia species. Perezone has been used as a purgative and for topical application to wounds. The extract has been found to be effective against *Streptococcus pyogenes, Candida albicans* and *Staphylococcus aureus*, organisms which are often involved in secondarily infected dermatophytoses.

The present invention is directed to compositions containing an effective amount of a mixture of griseofulvin with perezone in a ratio of from about 5 parts of the former to about 95 parts of the latter to a ratio of about 95 parts of the former to about 5 parts of the latter, as well as intermediate ratios such as 11:89, 33:67, 50:50 and 80:20. In addition, the invention provides compositions for both topical and oral administration of the mixtures of griseofulvin and perezone comprising pharmaceutical carriers having an effective amount of the antimicrobial agents incorporated therein. In the present specification and claims, the term "pharmaceutical carrier" refers to suitable known pharmaceutical excipients which are substantially non-toxic and non-sensitizing and which are compatible with the antimicrobial mixtures of the invention. Representative and suitable pharmaceutical carriers for compositions to be administered topically can include:

(1) Ointment bases containing ingredients such as diesters of polyethylene glycols having a molecular weight of from about 200 to 600 with fatty acids containing from 12 to 16 carbon atoms and fatty acid esters of glycerol in which the fatty acids contain from 12 to 18 carbon atoms, inclusive, peanut oil, petrolatum and mineral oil;

(2) Water-miscible cream and lotion bases containing ingredients such as beeswax, fatty acid esters of polyethylene glycols and water;

(3) Powder bases containing such ingredients as talc;

(4) Fluid carrier compositions containing such ingredients as water, ethanol, isopropanol, and alcohol and water mixtures, and other similar pharmaceutical carriers.

Representative and suitable pharmaceutical carriers for compositions to be administered per os can include:

(1) Syrups or elixirs, emulsions and suspensions containing ingredients such as gum acacia, gum karaya and other vegetable gums, methyl cellulose, carageenin, alkali metal alginates, lecithin, ethyl alcohol, water, sugar and other sweeteners and natural and artificial flavors and colors;

(2) Tablets containing such ingredients as cornstarch, lactose, glucose, magnesium carbonate, sugar and other sweeteners and natural and artificial flavors and colors;

(3) Hard or soft gelatin capsules, and other similar pharmaceutical carriers.

The present griseofulvin-perezone compositions, when employed topically, give better and more reliable control of various fungal organisms than compositions containing griseofulvin alone. Furthermore, topical applications of an effective amount of the mixtures of the invention give consistent control of dermatophytes. Furthermore, whether administered topically or per os, the compositions of the invention have been found to demonstrate activity against dermatophytoses greater than that obtained by use of either griseofulvin or perezone alone. The topical application of the compositions of the invention has further advantages due to the activity of perezone against Staphylococcus, Streptococcus and Candida, species of which are often present in secondarily infected dermatophytoses.

The effected amount of the active mixture to be employed can vary depending upon such factors as the organism to be controlled, the ratio of griseofulvin and perezone in a particular mixture, the severity of the infection, whether or not the treatment is designed for prophylactic or therapeutic use and whether or not the composition is to be administered orally or topically. Thus, good results have been obtained with as little as about 6 milligrams per kilogram of a griseofulvin-perezone mixture when administered per os. On the other hand, for topical application in treatment of active fungal infections, good results have been obtained with concentrations as low as from 0.05 to 0.1 percent of the antimicrobial mixture in an ointment base.

The following examples are merely illustrative and are not intended to be limiting.

Example 1

Ten grams of gum acacia are suspended in 90 grams of distilled water and heated in a boiling water bath with occasional stirring until dissolved. The solution is finally filtered through cotton and allowed to cool to room temperature. To 95 milliliters of cooled mixture are added 2.5 grams of griseofulvin and 2.5 grams of perezone. The resulting mixture is stirred to provide an aqueous suspension suitable for oral administration.

Example 2

Ten parts of white petrolatum U.S.P., 10 parts of liquid petrolatum U.S.P., 12 parts of Glycowax S–932

(a polyhydric alcohol fatty acid ester), 10 parts of polyethylene glycol 400 distearate and 58 parts of polyethylene glycol 400 dilaurate are mixed together in a clean, dry sterile vessel. The mixture is heated to approximately 120° C. and maintained at that temperature with occasional stirring for about one hour. The mixture is allowed to cool to approximately 55°–60° C. It is then gently stirred until cool to approximately 40°–45° C. to produce an ointment base. To 99.95 grams of this base is added 0.025 gram of griseofulvin and 0.025 gram of perezone, after which the product is mixed well and milled to a uniform consistency.

In a similar procedure, to 95 parts of the ointment base prepared as described above is added 1.1 parts of griseofulvin and 8.9 parts of perezone, after which the product is mixed well and milled to a uniform consistency.

In a similar procedure, t o95 parts of the ointment base prepared as described above are added 4 parts of griseofulvin and 1 part of perezone and the product is mixed well to a uniform consistency.

Example 3

The backs of white guinea pigs were shaved and three separate aqueous 10 percent gum acacia suspensions of griseofulvin and perezone were administered to separate guinea pigs to provide oral doses of (A) 6.25 milligrams per kilogram of griseofulvin and 50 milligrams per kilogram of perezone, (B) 6.25 milligrams per kilogram of griseofulvin and 25 milligrams per kilogram of perezone, and (C) 6.25 milligrams per kilogram of griseofulvin and 12.5 milligrams per kilogram of perezone, respectively. The guinea pigs were administered the griseofulvin-perezone mixtures daily for two days. Immediately after the second dose, the shaved backs of the guinea pigs were inoculated with a standardized spore suspension of *Trichophyton mentagrophytes* by scratching through the suspension over a circular area of about 1.5 centimeters in diameter with sufficient pressure to produce slight scarification of the skin. With the technique employed, 2 to 3 days after the inoculation, a definite area of erythema appears, increasing with minor scaling to about the fifth day. Around the sixth day, the lesion shows a raised periphery and increased scaliness with crust formation beginning to develop. The crust formation reaches maximum development at about the twelfth day. The guinea pigs were administered the griseofulvin-perezone mixtures daily for eight days following inoculation for a total of ten administrations. The guinea pigs so treated did not develop lesions.

Similar groups of guinea pigs were similarly treated with an aqueous 10 percent gum acacia suspension of griseofulvin to provide a daily oral dose of 6.25 milligrams per kilogram. The guinea pigs treated only with griseofulvin developed lesions having the same pathological pattern and duration as the lesions observed in untreated animlas. A third group of guinea pigs was similarly treated with aqueous 10 percent gum acacia suspensions of perezone to provide a daily oral dose of 50 miligrams per kilogram of perezone. The animals treated with the perezone compositions developed lesions having the same pathological pattern as the lesions observed in untreated control animals.

Example 4

The backs of white guinea pigs were shaved and the animals were inoculated as described in Example 3. Various griseofulvin-perezone mixtures in aqueous 10 percent gum acacia suspensions were administered orally to the animals in the same manner as described above in Example 3. Failure to develop lesions was recorded as protection of the animal. The daily oral dose of griseofulvin and perezone in the mixtures and the number of animals protected compared to the number of animals tested are set forth in the following table.

| Daily oral dose (milligrams/kilogram) in 10 percent gum acacia suspension | | No. of animals protected |
|---|---|---|
| Griseofulvin | Perezone | No. of animals tested |
| 6.25 | 50 | 2/2 |
| 6.25 | 25 | 4/4 |
| 6.25 | 12.5 | 4/4 |
| 6.25 | 6.25 | 4/4 |
| 6.25 | 3.12 | 4/4 |
| 6.25 | 1.56 | 3/3 |
| 3.12 | 12.5 | 3/3 |
| 3.12 | 6.25 | 4/4 |
| 3.12 | 3.12 | 3/3 |

In similar operations, groups of guinea pigs prepared as described above and treated with compositions containing only perezone with daily orals doses varying from 6.25 to 200 milligrams per kilogram were repeatedly found to develop lesions having the same pathological pattern and duration as lesions observed in untreated animals. In similar operations, guinea pigs administered a daily oral dose of 3.12 milligrams per kilogram of griseofulvin were repeatedly found to develop lesions. Daily oral doses of 6.25 milligrams per kilogram of griseofulvin were found to give variable results ranging from no protection at all in one group, to 67 percent protection in a second group, to 100 percent protection in a third group.

Example 5

The backs of guinea pigs were shaved and the animals were inoculated as described in Example 3. Application of a composition containing 0.05 percent griseofulvin and 0.05 percent of perezone in the ointment base of Example 2 directly to the inoculated area on the first day following inoculation and continued once daily for a total of six applications was found to prevent the formation of the experimental lesion in all the animals. In similar operations, applications of a composition containing 0.025 percent griseofulvin and 0.025 percent perezone in the ointment base of Example 2 directly to the inoculated area prevented the formation of the experimental lesions in all the guinea pigs. In similar operations, 0.1 percent of griseofulvin in the ointment base of Example 2 was found to be the lowest concentration of griseofulvin which prevented formation of experimental lesions in all animals tested. In other operations, 1.0 percent of perezone in the ointment base of Example 2 was found to be the lowest concentration of perezone which provided complete protection for all animals tested.

Example 6

Two parts of bleached beeswax, 18 parts of stearic acid, 5 parts of polyethylene glycol 400 monostearate, 8 parts of polyethylene glycol 1000 monostearate and 67 parts of sterile distilled water are heated with stirring in a clean, dry sterile vessel to melt the solid ingredients. Following the melting period, the mixture is stirred constantly while cooling at room temperature to approximately 40°–45° C. to produce a water-miscible cream base. To 95 parts of this cream base are added 5 parts of a 5:95 mixture of griseofulvin and perezone and the product is mixed well to a uniform consistency.

In a similar procedure, to 97 parts of the cream base prepared as described above is added 3 parts of a 95:5 mixture of griseofulvin and perezone and the product is mixed well to a uniform consistency.

In a similar procedure, to 90 parts of the cream base prepared as described above is added 10 parts of a 50:50 mixture of griseofulvin and perezone and the product is mixed well to a uniform consistency.

What is claimed is:

1. An antimicrobial composition comprising a mixture consisting of
   (A) griseofulvin, and
   (B) perezone, the ratio of (A) to (B) being from about 11:89 to about 80:20, inclusive.

2. An antimicrobial composition comprising a pharmaceutical carrier having incorporated therein from about 0.05 to about 10 percent of a mixture consisting of griseofulvin and perezone, the ratio of griseofulvin to perezone being from about 11:89 to about 80:20, inclusive.

3. An antimicrobial composition for oral administration comprising a pharmaceutical carrier having incorporated therein an effective amount of a mixture consisting of griseofulvin and perezone, the ratio of griseofulvin to perezone being from about 11:89 to about 80:20, inclusive.

4. The composition of claim 1 wherein the ratio of griseofulvin to perezone is 50:50.

5. The composition of claim 1 wherein the ratio of griseofulvin to perezone is 33:67.

References Cited

FOREIGN PATENTS 810,377  3/1959  Great Britain.

OTHER REFERENCES

Martinez: Las Plantas Medicinales de Mexico, 1959, pp. 258–261.

ALBERT T. MEYERS, Primary Examiner

JEROME D. GOLDBERG, Assistant Examiner

U.S. Cl. X.R.

424—285